Patented Nov. 10, 1931

1,831,521

UNITED STATES PATENT OFFICE

JOHN F. WISEMAN, OF DORCHESTER, MASSACHUSETTS

PREPARATION FOR PREVENTING ACCUMULATION OF MOISTURE AND THE LIKE

No Drawing.   Application filed April 11, 1930. Serial No. 443,619.

This invention has for its object to provide a novel and highly efficient preparation for application to window panes, windshields, and the other glass or hard enamel surfaces, for the purpose of preventing the accumulation of steam, rain, snow, mist, frost or ice upon such surfaces.

Another object of the invention is to provide a composition in liquid form which may be applied to glass or like surfaces for facilitating removal of ice, frost, snow, rain and mist from such surfaces.

Still another object of the invention is to provide a preparation of the above kind which may be conveniently applied to the surface in such a manner as to form an invisible film thereon, and which will effectively prevent the accumulation of rain, snow, ice or the like on such surfaces for a considerable time for each application.

The composition embodying the present invention consists of an intimate mixture of the following ingredients in approximately the proportions stated:

| Ingredient | Amount |
|---|---|
| Dye | $\frac{1}{16}$ of an ounce |
| Glycerine | 10 ounces |
| Denatured alcohol | 20 drops |
| Rosewater | 6 ounces |
| Table salt | $\frac{1}{16}$ of an ounce |
| Sulphur | $\frac{1}{16}$ of an ounce |

In preparing the preparation, the dye and rosewater are thoroughly mixed until the dye is dissolved, after which the sulphur is added and thoroughly mixed with the dye and rosewater until dissolved. The table salt is then added to this mixture and thoroughly mixed therewith, after which the alcohol and glycerine are added and thoroughly mixed with the remaining ingredients. Dye is a well known commercial product which has been found especially suitable for use in this preparation as a transparent mild coloring medium. The rosewater is used to thin the glycerine so that it will not form a thick film and interfere with the vision when the preparation is applied to transparent surfaces. The glycerine and rosewater form the body of the composition, while the glycerine, as is well known, serves to prevent the accumulation of moisture, water, mist, snow and sleet upon the glass or other surface to which the preparation is applied. The sulphur, denatured alcohol and table salt are used to reduce the composition to the desired consistency and to lower the freezing point of the preparation as well as to enhance its property of loosening snow or sleet accumulation upon surfaces to which the preparation may be applied.

I am aware of the fact that each of the ingredients or their broad equivalents have been used before in preparations of the present character, and that the general characteristics and properties of such ingredients are more or less well known. However, the exact ingredients and proportions thereof have been found to give especially good and superior results, the ingredients and proportions having been arrived at after considerable study and experiment. Many preparations of this kind have been proposed before which have been more or less efficient, but so far as I am aware, most of them are open to one objection or another. In some cases, the preparations interfere to some degree with the transparency of the medium or surface to which the preparation is applied. In other cases, the preparation does not remain upon or cling to the surface for a material period of time. The present preparation overcomes these difficulties or objections in an unusually effective manner, and in one instance, the preparation was applied to a window to remove and prevent the accumulation of steam and the like, and twenty-four hours after application the window remained perfectly clear.

In the use of the preparation, it is applied with a soft cloth, being rubbed over the surface sought to be treated or cleared.

It is of course to be understood that the proportions of the ingredients may be varied within reasonable limits without departing from the spirit and scope of the invention as claimed.

What I claim as new is:

A liquid preparation for preventing the accumulation of moisture and the like upon glass and like surfaces, comprising a mixture of dye, glycerine, denatured alcohol, rose-water, table salt, and sulphur, in about the proportions of dye $\frac{1}{16}$ of an ounce, glycerine 10 ounces, denatured alcohol 20 drops, rose-water 6 ounces, table salt $\frac{1}{16}$ of an ounce, and sulphur $\frac{1}{16}$ of an ounce.

In testimony whereof I affix my signature.

JOHN F. WISEMAN.